(12) United States Patent
Oh et al.

(10) Patent No.: US 10,166,905 B2
(45) Date of Patent: Jan. 1, 2019

(54) HEATING AND COOLING CUP HOLDER

(71) Applicant: Hyundai Motor Company, Seoul (KR)

(72) Inventors: Man Ju Oh, Yongin-si (KR); Jae Woong Kim, Hwaseong-si (KR); Jae Woo Park, Ansan-si (KR); Jae Hoon Kim, Cheonan-si (KR)

(73) Assignee: Hyundai Motor Company, Seoul (KR)

( * ) Notice: Subject to any disclaimer, the term of this patent is extended or adjusted under 35 U.S.C. 154(b) by 740 days.

(21) Appl. No.: 14/515,091

(22) Filed: Oct. 15, 2014

(65) Prior Publication Data

US 2015/0107270 A1   Apr. 23, 2015

(30) Foreign Application Priority Data

Oct. 17, 2013  (KR) .................. 10-2013-0123953

(51) Int. Cl.
  *B60N 3/10* (2006.01)
  *A47G 23/02* (2006.01)
  *F25B 21/04* (2006.01)

(52) U.S. Cl.
  CPC ......... *B60N 3/104* (2013.01); *A47G 23/0208* (2013.01); *A47G 2023/0275* (2013.01); *F25B 21/04* (2013.01); *F25B 2321/023* (2013.01); *F25B 2321/0251* (2013.01)

(58) Field of Classification Search
  CPC ..... F25D 31/007; F25D 31/008; B60N 3/104; B60N 3/10; A47G 2023/0275; A47G 23/0208; F25B 21/02; F25B 21/04; F25B 2321/02; F25B 2321/025

USPC .................................................. 62/3.3, 3.61
  See application file for complete search history.

(56) References Cited

U.S. PATENT DOCUMENTS

| 5,720,171 A | 2/1998 | Osterhoff et al. |
| 6,449,958 B1 * | 9/2002 | Foye ............ B60N 3/101 62/3.2 |
| 6,658,858 B1 * | 12/2003 | Thompson .......... A23B 7/0425 62/3.2 |
| 6,918,257 B2 * | 7/2005 | Slone .................. F25B 21/04 62/244 |

(Continued)

FOREIGN PATENT DOCUMENTS

| CN | 101346256 A | 1/2009 |
| JP | 2001-208465 A | 8/2001 |

(Continued)

*Primary Examiner* — Tareq Alosh
(74) *Attorney, Agent, or Firm* — Morgan, Lewis & Bockius LLP (57) ABSTRACT

A heating and cooling cup holder may include a holder body having an opened upper end and a blast hole formed in a side surface of the holder body into which wind is introduced, a heat exchanging body having a front surface coupled to an outer side surface of the holder body to cover the blast hole and having an inlet formed in one side surface of the heat exchanging body to allow the wind introduced through the inlet to be heat-exchanged, a first peltier element having a front surface coupled to a rear surface of the heat exchanging body, a heat dissipating module coupled to a rear surface of the first peltier element, a second peltier element having an upper surface coupled to a lower surface of the holder body, and a heat pipe heat-exchangeably connecting a lower surface of the second peltier element to the heat dissipating module.

10 Claims, 5 Drawing Sheets

(56) References Cited

U.S. PATENT DOCUMENTS

| | | | | |
|---|---|---|---|---|
| 8,104,295 B2* | 1/2012 | Lofy | ................ | B60N 3/104 62/3.1 |
| 2005/0257532 A1* | 11/2005 | Ikeda | ................ | F25B 21/02 62/3.7 |
| 2006/0117761 A1* | 6/2006 | Bormann | ................ | F25B 21/02 62/3.6 |
| 2008/0209912 A1* | 9/2008 | Upadhye | ................ | A47J 36/2438 62/3.61 |
| 2008/0229758 A1* | 9/2008 | Lin | ................ | F25B 21/02 62/3.2 |
| 2009/0038317 A1* | 2/2009 | Otey | ................ | F25B 21/04 62/3.2 |
| 2012/0192574 A1* | 8/2012 | Ghoshal | ................ | F25B 21/02 62/3.2 |
| 2013/0174578 A1* | 7/2013 | Brija | ................ | F25B 21/04 62/3.3 |
| 2014/0165597 A1* | 6/2014 | Hernon | ................ | H01M 10/5004 62/3.2 |

FOREIGN PATENT DOCUMENTS

| | | |
|---|---|---|
| KR | 20-0181246 Y1 | 5/2000 |
| KR | 10-0335829 B1 | 5/2002 |
| KR | 10-2006-0114593 A | 11/2006 |
| KR | 10-2007-0069058 A | 7/2007 |
| KR | 10-2013-0000157 A | 1/2013 |
| KR | 10-2013-0017655 A | 2/2013 |
| KR | 10-2013-0058094 A | 6/2013 |
| KR | 10-2013-0074934 A | 7/2013 |

\* cited by examiner

HEATING AND COOLING CUP HOLDER

CROSS REFERENCE TO RELATED APPLICATION

The present application claims priority to Korean Patent Application No. 10-2013-0123953 filed Oct. 17, 2013, the entire contents of which is incorporated herein for all purposes by this reference.

BACKGROUND OF THE INVENTION

Field of the Invention

The present invention relates to a heating and cooling cup holder capable of increasing convenience of a user due to a fast effect property and an improvement in performance and also increasing marketability since a beverage may be rapidly cooled and heated in a vehicle to be drunk.

Description of Related Art

A vehicle or the like is provided with a cup holder. This cup holder generally has only a simple holding function. However, in some vehicle models, a cup holder having a heating and cooling function has been introduced.

In general, the cup holder according to the related art is responsible for the heating and cooling simply using only heat conduction. However, sufficient heating and cooling may not be performed using only the heat conduction.

The cup holder according to the related art uses a first peltier element, but is responsible for the heating and cooling of a cup accommodated therein by performing only the heat conduction to a cup holder body through conduction.

However, in this technology, in the case in which a contact area between the cup and the cup holder is small, the heating and cooling function through the heat conduction may not be appropriately performed. That is, sizes of the cup and the cup holder do not always coincide with each other, and the cup may have a dented lower surface. Also, in case of a cup or the like made of paper having low heat conduction, there was a tendency that a heat transfer according to conduction is not substantially generated, such that a temperature of the cup coincides with an ambient temperature.

Therefore, a cup holder capable of appropriately implementing a substantial heating and cooling function by solving these problems has been demanded.

In addition, U.S. Pat. No. 5,720,171 B1 entitled "Device for Heating and Cooling a Beverage" has also suggested a cup holder. However, the invention disclosed in U.S. Pat. No. 5,720,171 B1 also implements the heating and cooling function of the cup holder only through conduction, such that substantial heating and cooling efficiency was significantly low.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating and cooling cup holder capable of increasing convenience of a user due to a fast effect property and an improvement in performance and also increasing marketability since a beverage may be rapidly cooled and heated in a vehicle to be drunk.

According to various aspects of the present invention, a heating and cooling cup holder may include a holder body having an opened upper end to accommodate a beverage, having a shape surrounding the beverage, and having a blast hole formed in a side surface of the holder body and into which wind is introduced, a heat exchanging body having a front surface coupled to an outer side surface of the holder body to cover the blast hole and having an inlet formed in one side surface of the heat exchanging body to allow the wind introduced through the inlet to be heat-exchanged and discharged into the holder body through the blast hole, a first peltier element having a front surface coupled to a rear surface of the heat exchanging body, a heat dissipating module coupled to a rear surface of the first peltier element, a second peltier element having an upper surface coupled to a lower surface of the holder body, and a heat pipe heat-exchangeably connecting a lower surface of the second peltier element to the heat dissipating module.

The heat pipe may have a front end portion closely adhered to the lower surface of the second peltier element and a rear end portion closely adhered to a rear surface of the heat dissipating module.

The heat pipe may have a front end portion closely adhered to the lower surface of the second peltier element and a rear end portion upwardly bent at a middle portion of the heat pipe and closely adhered to a rear surface of the heat dissipating module.

The heat pipe may have a front end portion closely adhered to the lower surface of the second peltier element and a rear end portion closely adhered to a front surface of the heat dissipating module.

The rear end portion of the heat pipe may be closely adhered to a side portion of the first peltier element on the front surface of the heat dissipating module.

The rear surface of the first peltier element and the lower surface of the second peltier element may be respectively connected to the heat dissipating module through separate heat pipes.

The rear surface of the first peltier element may be connected to a front surface of the heat dissipating module through the heat pipe and the lower surface of the second peltier element may be connected to a rear surface of the heat dissipating module through the heat pipe.

The heating and cooling cup holder may further include an exterior holder having an inner diameter larger than an outer diameter of the holder body and forming a ventilation space between the exterior holder and the holder body as a shape surrounding the side surface of the holder body.

The heating and cooling cup holder may further include a blower provided in the ventilation space to receive air in the ventilation space and having an outlet connected to the inlet of the heat exchanging body.

The front surface of the heat exchanging body may be coupled to the outer side surface of the holder body to cover the blast hole, the inlet may be formed in one side surface of the heat exchanging body and heat transfer fins are formed in the heat exchanging body to allow wind introduced through the inlet to be heat-exchanged by the heat transfer fins and discharged into the holder body through the blast hole.

The heat transfer fins may be a plurality of guide ribs guiding the wind introduced through the inlet to the blast hole.

The front surface of the heat exchanging body may be a curved surface closely adhered to the outer side surface of the holder body.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
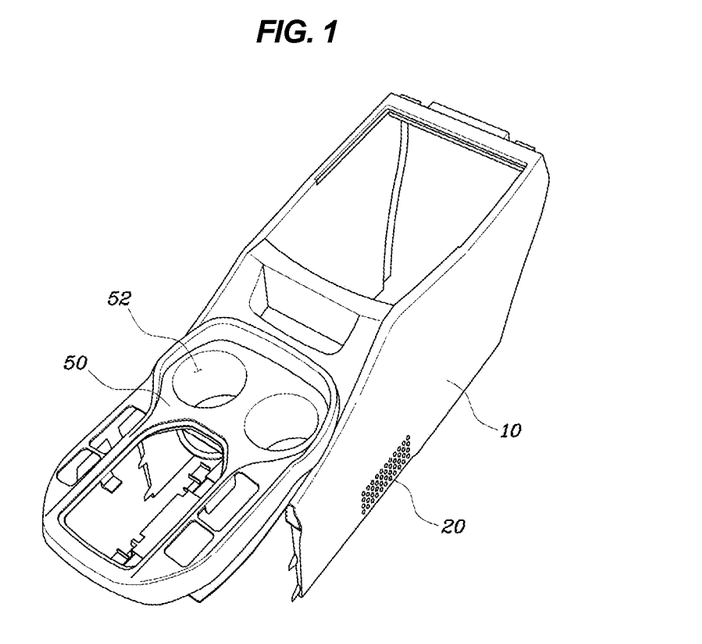
FIG. 1 is a perspective view of an exemplary heating and cooling cup holder according to the present invention installed in an armrest.

First, FIG. 1 is a perspective view of a heating and cooling cup holder according to various embodiments of the present invention installed in an armrest 10. Here, the heating and cooling cup holder according to the present invention may be installed in the armrest 10 of a vehicle. To this end, the armrest 10 is provided with a cup holder cover 50, a cup is accommodated into an upper end 52 of the cover 50, and the cup holder according to the present invention is installed beneath the upper end 52.

The cup holder according to the present invention may include a holder body 100 having an opened upper end to accommodate a beverage, having a shape surrounding the beverage, and having a blast hole 120 formed in a side surface thereof and into which wind is introduced, a heat exchanging body 300 having a front surface coupled to an outer side surface of the holder body 100 to cover the blast hole 120, having an inlet 320 formed in one side surface thereof, and having heat transfer fins 340 formed therein to allow wind introduced through the inlet 320 to be heat-exchanged by the heat transfer fins 340 and to be then discharged into the holder body 100 through the blast hole 120, a first peltier element 900 having a front surface coupled to a rear surface of the heat exchanging body 300, a heat dissipating module 500 coupled to a rear surface of the first peltier element 900, an exterior holder 200 formed to have a diameter larger than that of the holder body 100 and forming a ventilation space between the exterior holder 200 and the holder body 100 as a shape surrounding the side surface of the holder body 100, a blower 700 provided in the ventilation space to receive air in the ventilation space and having an outlet connected to the inlet 320 of the heat exchanging body 300, a second peltier element 950 having an upper surface coupled to a lower surface of the holder body 100, and a heat pipe 400 heat-exchangeably connecting a lower surface of the second peltier element 950 to the heat dissipating module 500.

Figure 2:
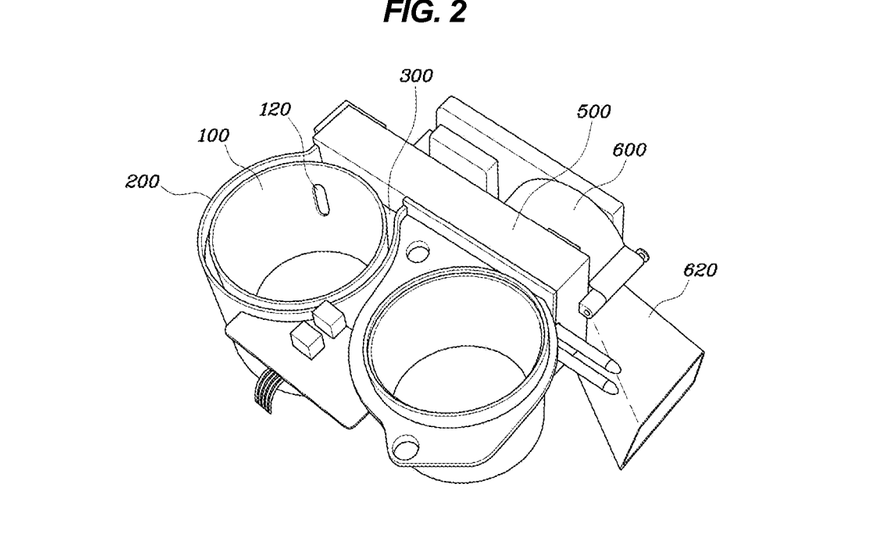
FIG. 2 is a perspective view of the exemplary heating and cooling cup holder according to the present invention.
Figure 3:
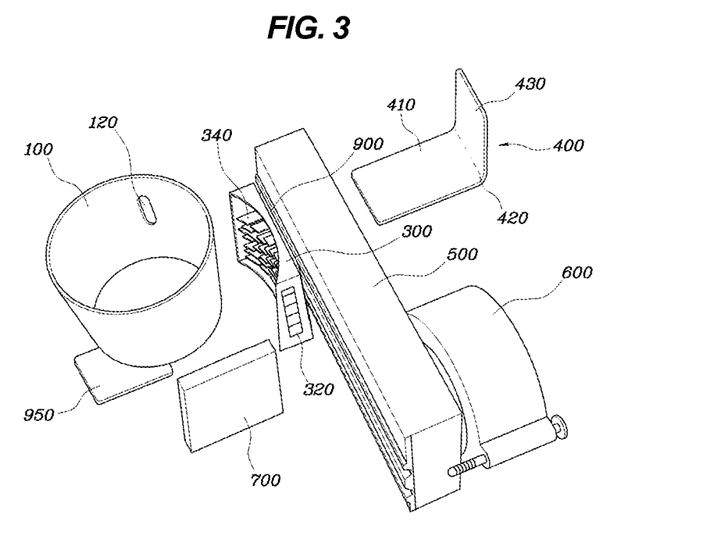
FIG. 3 is an exploded perspective view of the exemplary heating and cooling cup holder according to the present invention.
Figure 4:
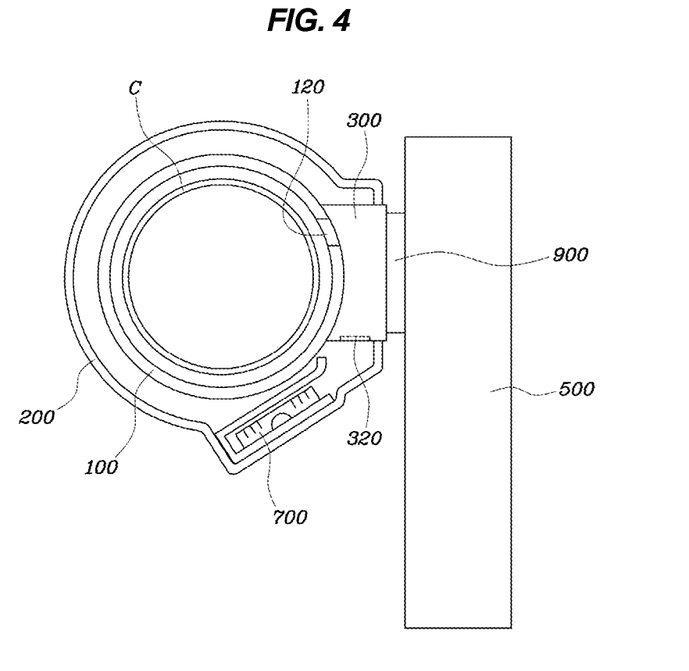
FIG. 4 is a top view of the exemplary heating and cooling cup holder according to the present invention.
Figure 5:
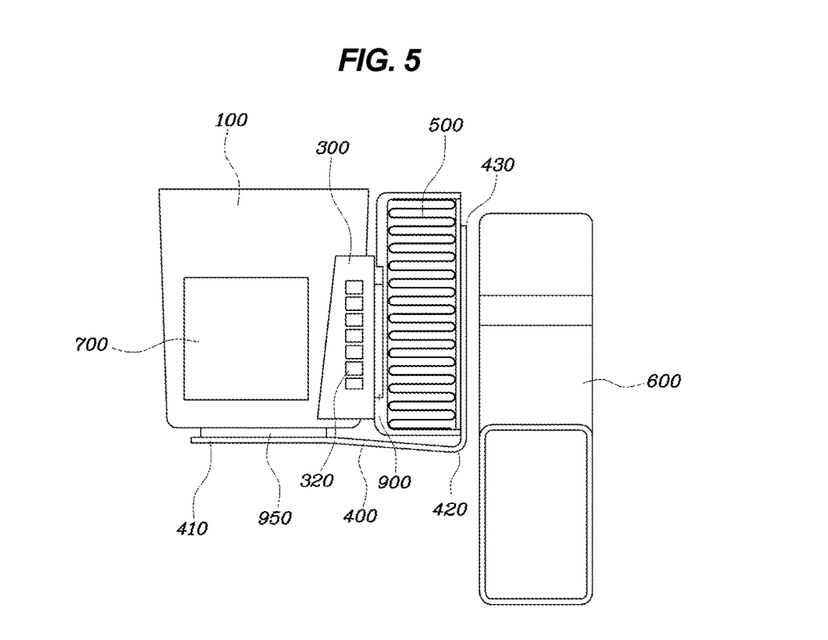
FIG. 5 is a side view of the exemplary heating and cooling cup holder according to the present invention.

FIG. 2 is a perspective view of the heating and cooling cup holder according to various embodiments of the present invention, FIG. 3 is an exploded perspective view of the heating and cooling cup holder according to various embodiments of the present invention, FIG. 4 is a top view of the heating and cooling cup holder according to various embodiments of the present invention, and FIG. 5 is a side view of the heating and cooling cup holder according to various embodiments of the present invention.

The holder body 100 may be formed of a material capable of performing heat conduction of a metal, thereby simultaneously performing convection and conduction. The holder body 100 has an opened upper end to accommodate the beverage therein, has a shape surrounding the beverage, and has the blast hole 120 formed in the side surface thereof and into which the wind is introduced. The air-conditioned air introduced through the blast hole 120 collides with a cup C, is upwardly raised, and is again introduced into the blower 700.

In addition, the heat exchanging body 300 has a front surface coupled to the outer side surface of the holder body 100 to cover the blast hole 120. The heat exchanging body 300 has an inlet 320 formed in one side surface thereof to introduce air and heat transfer fins 340 formed therein to heat-exchange the wind introduced into the inlet by the heat transfer fins 340. In addition, the heat-exchanged wind is discharged into the holder body 100 through the blast hole 120 to thereby perform a convective heat transfer toward a cup C side.

In addition, the first peltier element 900 has a front surface coupled to a rear surface of the heat exchanging body 300 to directly cool or heat the heat exchanging body 300. Therefore, the air introduced into the heat exchanging body 300 and discharged into the holder body 100 is air-conditioned. In addition, at the same time, since the heat exchanging body 300 is directly coupled to the holder body 100, it performs the cooling or heating of the entire holder body 100 to perform the heat transfer by conduction with the cup C, and the air between the holder body 100 and the cup C may perform the convective heat transfer at more excellent efficiency by the conduction of the holder body 100.

The heat dissipating module 500 is coupled to a rear surface of the first peltier element 900 to thereby remove heat generated from an opposing side of the first peltier element 900.

Meanwhile, the exterior holder 200 is formed to have a diameter larger than that of the holder body 100 and forms a ventilation space between the exterior holder 200 and the holder body 100 as a shape surrounding the side surface of the holder body 100. In addition, the blower 700 is provided in the ventilation space to receive air in the ventilation space and has an outlet connected to the inlet 320 of the heat exchanging body 300 to supply the received air to the heat exchanging body 300.

Therefore, the air between the cup C and the holder body 100 goes over the upper end as shown in FIG. 4, is again introduced between the holder body 100 and the exterior holder 200, and is transferred to the heat exchanging body 300 through the blower 700. In addition, the heat exchanging body 300 again air-conditions the air to thereby re-introduce it between the holder body 100 and the cup C through the blast hole 120. At the same time, the heat exchanging body 300 may perform the heating and cooling of the cup by the convective heat transfer and the conduction by directly conducting the holder body 100, and the convection air is continuously re-circulated and air-conditioned, thereby increasing an air-conditioning efficiency and a fast effect property. The reason is that the first peltier element 900 ultimately cools and heats the heat exchanging body 300, and since an opposing surface of the first peltier element 900 dissipates heat by the heat dissipating module 500, it may be stably operated.

Meanwhile, the heat exchanging body 300 is coupled to the holder body 100 so that the inlet 320 is formed in one side surface and the blast hole 120 is positioned at the other end portion, thereby having an opportunity that the air is sufficiently air-conditioned through the heat transfer fins 340 formed in the heat exchanging body 300.

The heat transfer fins 340 may be a plurality of guide ribs guiding the wind introduced into the inlet 320 to the blast hole 120. The guide ribs may have a platy cylinder shape protruding from the rear surface of the heat exchanging body 300 and extended to contact the outer side surface of the holder body 100.

In addition, the front surface of the heat exchanging body 300 is formed in a curved surface shape which is closely adhered to the outer side surface of the holder body 100, thereby maximally drawing the heating and cooling of the holder body 100 by the conduction.

Meanwhile, as shown in FIG. 2, the exterior holder 200 surrounds the side surface of the holder body 100 and is cut and opened at a portion in which the heat exchanging body 300 is installed, wherein the cut portion may be coupled to the heat dissipating module 500. By the above-mentioned configuration, a direct coupling relationship among the holder body 100, the heat exchanging body 300, the first peltier element 900, and the heat dissipating module 500 may be maintained. At the same time, the exterior holder 200 surrounds the holder body 100, such that the holder body 100 may have a shape in which the side surface thereof is closed by another configuration.

In addition, the heat dissipating module 500 may have a heat dissipating fan 600 coupled to the rear surface thereof. The heat dissipating fan 600 may receive the air which is heat-exchanged with the heat dissipating module 500, and may have a discharging duct 620 formed in one side thereof. In addition, the holder body 100, the heat exchanging body 300, the first peltier element 900, the heat dissipating module 500, the exterior holder 200, and the blower 700 may be provided in the armrest 100 of the vehicle, the heat dissipating fan 600 may receive the air which is heat-exchanged with the heat dissipating module 500 and may have a discharging duct 620 formed in one side thereof, and the discharging duct 620 may be extended to a grill 20 which is in communication with the outside of the armrest 10. Therefore, waste heat generated due to a use of the first peltier element 900 is discharged to the outside of the armrest 10, thereby making it possible to prevent the waste heat from being accumulated in an interior and maintain efficiency of the cup holder.

In addition, the holder body 100 has a lower surface coupled to an upper surface of the second peltier element 950 and the heat pipe 400 heat-exchangeably connecting the lower surface of the second peltier element 950 and the heat dissipating module 500 to each other is provided. The heat pipe 400 may have a front end portion 410 which is closely adhered to the lower surface of the second peltier element 950 and a rear end portion 430 which is closely adhered to the rear surface of the heat dissipating module 500. Specifically, the heat pipe 400 may have the front end portion 410 which is closely adhered to the lower surface of the second peltier element 950 and the rear end portion 430 which is upwardly bent at a middle end portion 420 and is then closely adhered to the rear surface of the heat dissipating module 500.

As such, since the second peltier element 950 performs only the heating and cooling by the conduction on the lower surface of the holder body 100, it increases efficiency of the cup holder together with the basic convective heat transfer of the first peltier element 900.

In addition, particularly, the convective heat transfer by an activation of the first peltier element 900 is required upon activating the cooling of the cup holder. However, the heating of the beverage in the cup is performed by activating only the second peltier element 950 using a fact that hot air is risen upon activating the heating of the cup holder, thereby making it possible to solve problems of inconvenience that the hot air may give a passenger.

Figure 6:
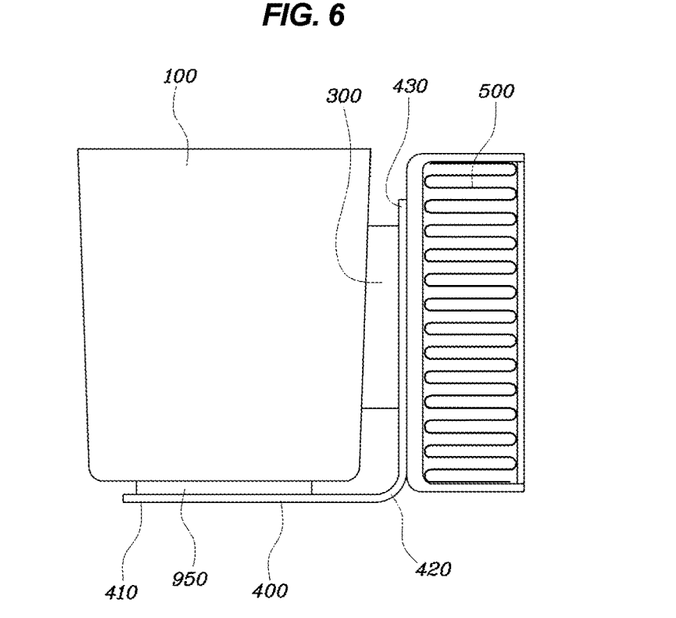
FIG. 6, FIG. 7, FIG. 8, and FIG. 9 are side views of exemplary heating and cooling cup holders according to the present invention.
Figure 7:
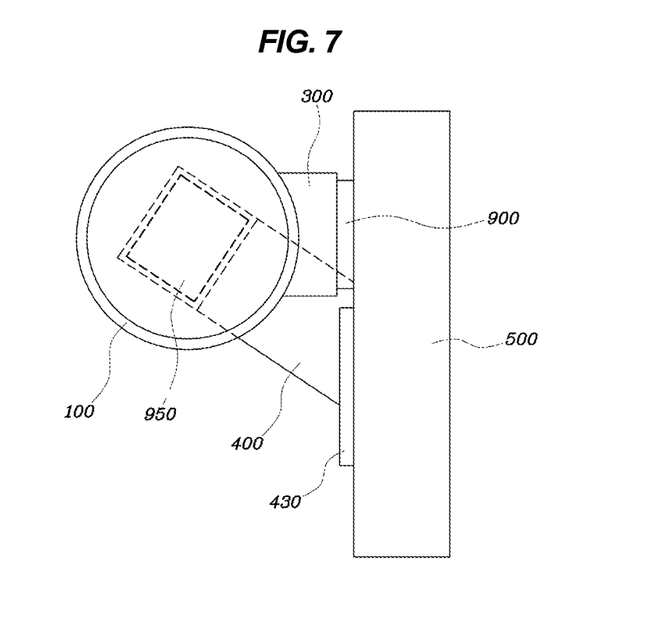

Meanwhile, as shown in FIGS. 6 and 7, the heat pipe 400 may have the front end portion 410 which is closely adhered to the lower surface of the second peltier element 950 and the rear end portion 430 which is closely adhered to the front surface of the heat dissipating module 500. In this case, the rear end portion 430 of the heat pipe 400 may be closely adhered to a side portion of the first peltier element 900 on the front surface of the heat dissipating module 500. Accordingly, the front surface part of the heat dissipating module 500 may be equally heated and the waste heat from the rear surface part may be removed using the heat dissipating fan 600, such that the entire area of the heat dissipating module 500 may be uniformly used.

Figure 8:
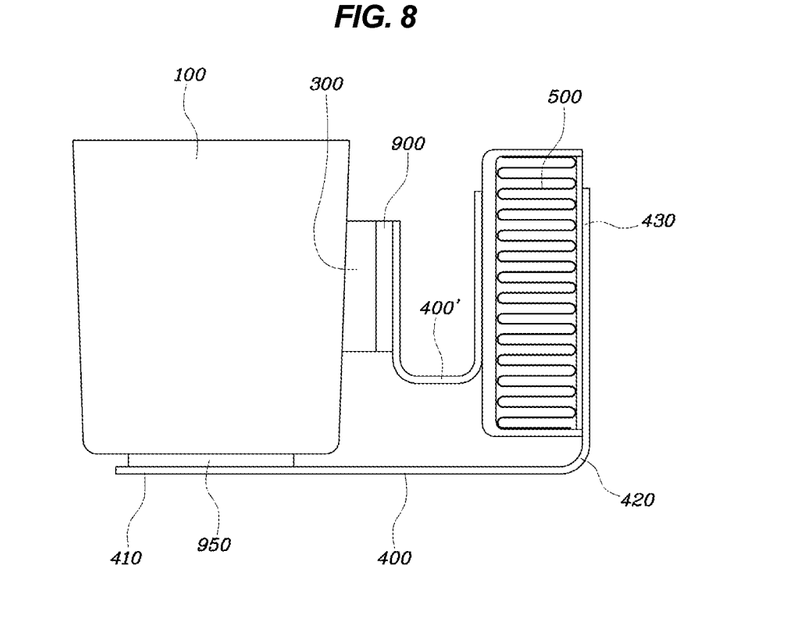
Figure 9:
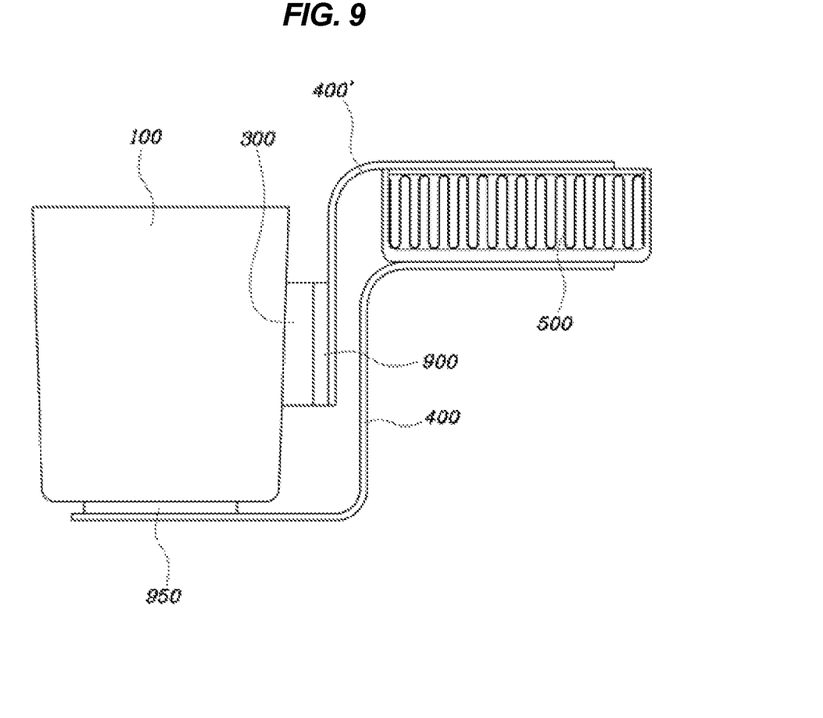

Alternatively, as shown in FIGS. 8 and 9, the rear surface of the first peltier element 900 and the lower surface of the second peltier element 950 may be respectively connected to the heat dissipating module through separate heat pipes 400 and 400'.

Particularly, as shown in FIG. 8, the rear surface of the first peltier element 900 may be connected to the front surface of the heat dissipating module 500 through the heat pipe 400' and the lower surface of the second peltier element 950 may be connected to the rear surface of the heat dissipating module 500 through the heat pipe 400. By the above-mentioned configuration, the heat dissipating module 500 may be spaced apart from the holder body 100 and spatial limit may be overcome.

According to the heating and cooling cup holder having the structure as described above, performance in reserving the beverage in the cooling or heating state may be maximized as compared to an existing refrigerator, and the heat escaping to the outside may be prevented by a control of air current, thereby making it possible to improve heat efficiency.

Therefore, the convenience of the user may be increased due to a fast effect property and an improvement in performance and marketability may be increased since the beverage may be rapidly cooled and heated in the vehicle to be drunk.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating and cooling cup holder, comprising:
a holder body having an opened upper end to accommodate a beverage, having a shape surrounding the beverage, and having a blast hole formed in a side surface of the holder body wherein wind is introduced into the holder body through the blast hole;
a heat exchanging body having a front surface directly coupled to an outer side surface of the holder body and covering the blast hole to directly conduct heat with the outer side surface of the holder body, and having an inlet formed in a side surface of the heat exchanging body to allow the wind introduced through the inlet to be heat-exchanged and discharged to an inner surface of the holder body through the blast hole, thereby to transfer heat simultaneously through conduction and convection, wherein the front surface of the heat exchanging body is a curved surface being in direct contact with the outer side surface of the holder body for the heat exchanging body to cover the blast hole of the holder body in the heat exchanging body;
a first peltier element having a front surface coupled to a rear surface of the heat exchanging body, wherein the holder body, the heat exchanging body and the first peltier element are coupled in series in a radial direction of the holder body;
a heat dissipating module coupled to a rear surface of the first peltier element;
a second peltier element having an upper surface coupled to a lower surface of the holder body; and
at least one heat pipe heat-exchangeably connecting a lower surface of the second peltier element to the heat dissipating module,
wherein a plurality of heat transfer fins is positioned inside the heat exchanging body,
wherein each of the plurality of heat transfer fins is shaped at an end portion thereof to conform to a proximate portion of the holder body, and
wherein the plurality of heat transfer fins is the plurality of guide ribs guiding the wind introduced through the inlet to the blast hole.

2. The heating and cooling cup holder of claim 1, wherein the heat pipe has a front end portion adhered to the lower surface of the second peltier element and a rear end portion adhered to a rear surface of the heat dissipating module.

3. The heating and cooling cup holder of claim 1, wherein the heat pipe is upwardly bent at a middle portion thereof, and has a front end portion adhered to the lower surface of the second peltier element and a rear end portion adhered to a rear surface of the heat dissipating module.

4. The heating and cooling cup holder of claim 1, wherein the heat pipe has a front end portion adhered to the lower surface of the second peltier element and a rear end portion adhered to a front surface of the heat dissipating module.

5. The heating and cooling cup holder of claim 4, wherein the rear end portion of the heat pipe is adhered on the front surface of the heat dissipating module at a position peripheral to a side portion of the first peltier element.

6. The heating and cooling cup holder of claim 1,
wherein the at least one heat pipe includes separate first and second heat pipes, and
wherein the rear surface of the first peltier element and the lower surface of the second peltier element are respectively connected to the heat dissipating module through the first and second heat pipes.

7. The heating and cooling cup holder of claim 6, wherein the rear surface of the first peltier element is connected to a front surface of the heat dissipating module through the first heat pipe and the lower surface of the second peltier element is connected to a rear surface of the heat dissipating module through the second heat pipe.

8. The heating and cooling cup holder of claim 1, further comprising an exterior holder surrounding the side surface of the holder body, wherein the exterior holder has an inner diameter larger than an outer diameter of the holder body such that a ventilation space is provided between the exterior holder and the holder body.

9. The heating and cooling cup holder of claim 8, further comprising a blower provided in the ventilation space to receive air in the ventilation space and having an outlet connected to the inlet of the heat exchanging body.

10. The heating and cooling cup holder of claim 1, wherein the front surface of the heat exchanging body is adhered to the outer side surface of the holder body.

* * * * *